US008863238B2

(12) United States Patent
Baba (10) Patent No.: US 8,863,238 B2
(45) Date of Patent: Oct. 14, 2014

(54) SYSTEM AND METHOD FOR MUTUAL AUTHENTICATION (71) Applicant: Nidec Sankyo Corporation, Nagano (JP)

(72) Inventor: Tsutomu Baba, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 44 days.

(21) Appl. No.: 13/677,481

(22) Filed: Nov. 15, 2012

(65) Prior Publication Data
US 2013/0133035 A1 May 23, 2013

(30) Foreign Application Priority Data

Nov. 21, 2011 (JP) ................. 2011-253629

(51) Int. Cl.
*H04W 12/06* (2009.01)
*H04L 9/08* (2006.01)
*H04L 29/06* (2006.01)
*H04L 9/32* (2006.01)

(52) U.S. Cl.
CPC .......... *H04L 63/0869* (2013.01); *H04L 9/0869* (2013.01); *H04L 9/3273* (2013.01)
USPC ................. 726/3; 380/42; 380/255; 380/259; 709/208; 709/209; 709/210; 709/211; 709/212; 709/213; 709/214; 709/215; 709/216; 709/228; 709/237; 713/150; 713/169; 726/2; 726/4; 726/16; 726/17; 726/21; 726/26; 726/27

(58) Field of Classification Search
CPC . H04L 9/3273; H04L 63/0869; H04W 12/06; G06F 21/445
USPC ............ 380/42, 255, 259; 709/208–216, 228, 709/237; 713/150, 169; 726/2–4, 16–17, 726/21, 26–27
See application file for complete search history.

(56) References Cited

U.S. PATENT DOCUMENTS 5,602,918 A * 2/1997 Chen et al. .................... 713/153
2004/0059685 A1* 3/2004 Sakamura et al. .............. 705/65
2008/0215887 A1* 9/2008 Hart et al. ..................... 713/172

FOREIGN PATENT DOCUMENTS

JP 2008-077297 4/2008

* cited by examiner

*Primary Examiner* — Joseph P. Hirl
*Assistant Examiner* — Kalish Bell
(74) *Attorney, Agent, or Firm* — Frommer Lawrence & Haug LLP (57) ABSTRACT A control unit for controlling a card reader. The control unit includes an authentication management unit for transmitting/receiving information to/from a host and each of a first encryption magnetic head device and a second encryption magnetic head device to mutually authenticate each other. The authentication management unit includes (1) a commanding means for commanding one of the first encryption magnetic head device and the second encryption magnetic head device to create lower-level information for authentication, according to a request on authentication from the host, (2) a sharing means for transmitting the lower-level information for authentication received from the above-mentioned one device to the other device for the purpose of sharing it and (3) a transmission means for transmitting the lower-level information for authentication, having been shared in all of the first encryption magnetic head device and the second encryption magnetic head device, to the host.

10 Claims, 4 Drawing Sheets

SYSTEM AND METHOD FOR MUTUAL AUTHENTICATION

The present application claims priority from Japanese Patent Application No. JP 2011-253629, filed on Nov. 21, 2011, the disclosure of which is incorporated herein by reference in its entirety.

FIELD OF THE INVENTION

The present invention relates to a system and a method for mutual authentication in which a higher-level device and a lower-level device mutually authenticate each other.

It is noted that citation or identification of any document in this application is not an admission that such document is available as prior art to the present invention.

In an information processing system, in which a higher-level device (for example, an ATM) issues a command for process execution to a lower-level device (for example, a card reader), and meanwhile the lower-level device having received the command executes the process and reports a process result to the higher-level device; sometimes a high security performance is requested in order to prevent a fraud such as impersonation. In such an information processing system, mutual authentication is executed between a higher-level device and a lower-level device in order to certify each other that both the two are valid. Then, after it could be certified that both the two are valid, operation proceeds with a normal step (for example, refer to Japanese Unexamined Patent Application Publication No. 2008-77297 ("JP 2008-77297")).

Furthermore, in recent years, sometimes a plurality of slave devices are connected in a structure of a lower-level device, and a security function is assigned to the slave devices, wherein a control unit of the lower-level device operates the slave devices. In the case of such an information processing system, a higher-level device executes mutual authentication with respect to each of the lower-level device and the slave devices in which the security function is built.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

Unfortunately, in the case of such an information processing system, a system builder for constructing a mutual authentication system, in which a higher-level device and a lower-level device mutually authenticate each other, needs to figure out how the lower-level device is configured, in order to create a program for the higher-level device to execute mutual authentication with respect to each of the lower-level device and slave devices. Therefore, the system building work becomes so complicated as to lower efficiency of the work.

Moreover, in order for the higher-level device to individually execute the mutual authentication with respect to each of the lower-level device and slave devices having a security function, not only the mutual authentication system becomes complicated, but also a processing time for proceeding with a normal step becomes prolonged, so as to unfortunately make the mutual authentication system redundant.

Then, it is an object of the present invention to provide a system and a method for mutual authentication, which enables an easy construction of a mutual authentication system even in the case where a lower-level device has a plurality of slave devices, for the mutual authentication system in which a higher-level device and the lower-level device mutually authenticate each other.

To achieve the object described above, the present invention provides the following aspects.

(1) A mutual authentication system including: a higher-level device and a lower-level device that mutually authenticate each other; wherein, the lower-level device includes; a control unit for controlling the lower-level device; and a plurality of slave devices controlled by the control unit; and the control unit includes; an authentication management unit for transmitting/receiving information for the higher-level device and each of the plurality of slave devices to mutually authenticate each other, to/from the higher-level device and each of the plurality of slave devices; and the plurality of slave devices individually include; an authentication processing unit for creating lower-level information for authentication for authenticating the higher-level device; and a memory unit for saving the lower-level information for authentication; and the authentication management unit includes; a commanding means for commanding one of the plurality of slave devices to create the lower-level information for authentication, according to a request on authentication from the higher-level device; a sharing means for transmitting the lower-level information for authentication received from the above-mentioned one of the slave devices, to the other of the slave devices for the purpose of sharing it; and a transmission means for transmitting the lower-level information for authentication, having been shared in all the plurality of slave devices, to the higher-level device.

According to the present invention, in the mutual authentication system in which the higher-level device and the lower-level device mutually authenticate each other, the lower-level device is equipped with an authentication management unit; and therefore the higher-level device can execute authentication with the lower-level device, or a plurality of slave devices, by means of sending/receiving information of mutual authentication from/to the higher-level device to/from the authentication management unit, even in the case where the lower-level device has the plurality of slave devices. Accordingly, the higher-level device does not need to execute multiple times of authentication with respect to each of the slave devices, though such authentication is needed in a conventional technology. Eventually, the system to be constructed becomes simple, and then the mutual authentication system can easily be constructed.

(2) The mutual authentication system; wherein the higher-level device includes an authentication processing unit for authenticating each of the plurality of slave devices; and the authentication processing unit creates higher-level information for authentication for authenticating each of the plurality of slave devices, and also creates authentication response information by way of mixing the higher-level information for authentication and the transmitted lower-level information for authentication.

According to the present invention, the authentication processing unit creates the higher-level information for authentication in order to authenticate each of the plurality of slave devices, and creates the authentication response information by way of mixing the higher-level information for authentication and the lower-level information for authentication. Accordingly, there can be created information for a higher-level device to authenticate a lower-level device, or each of multiple devices; as well as information for the lower-level device, or each of multiple devices to authenticate the higher-level device. Therefore, a processing time for authentication of the mutual authentication system can be shortened.

(3) The mutual authentication system; wherein a common key cryptogram method is used for the higher-level device and the plurality of slave devices to mutually authenticate each other; and the plurality of slave devices have a secret key that is shared with the higher-level device.

According to the present invention, the information for mutual authentication for the higher-level device and the plurality of slave devices to mutually authenticate each other by using the secret key shared is transmitted/received; and therefore, countermeasures can be taken against a threat of bugging, falsification, and impersonation in information communication between the higher-level device and the plurality of slave devices so as to enable safe mutual authentication.

(4) A mutual authentication method including: mutual authentication between a higher-level device and each of a plurality of slave devices; wherein a lower-level device connected to the higher-level device includes; a control unit for controlling the lower-level device; and the plurality of slave devices controlled by the control unit; and the control unit includes; an authentication management unit for transmitting/receiving information for the higher-level device and each of the plurality of slave devices to mutually authenticate each other, to/from the higher-level device and each of the plurality of slave devices; and the mutual authentication method further includes: a commanding step by the authentication management unit for commanding one of the plurality of slave devices to create lower-level information for authentication, for each of the plurality of slave devices to authenticate the higher-level device, according to a request on authentication from the higher-level device; a sharing step by the authentication management unit for transmitting the lower-level information for authentication received from the above-mentioned one of the slave devices, to the other of the slave devices for the purpose of sharing it; and a transmission step by the authentication management unit for transmitting the lower-level information for authentication, having been shared in all the plurality of slave devices, to the higher-level device.

According to the present invention, in the mutual authentication method in which the higher-level device and each of the plurality of slave devices mutually authenticate each other, the lower-level device is equipped with the authentication management unit; and therefore, even in the case where the lower-level device has the plurality of slave devices, the higher-level device can execute authentication with the lower-level device, or the plurality of slave devices, by means of sending/receiving information of mutual authentication from/to the higher-level device to/from the authentication management unit. Accordingly, the higher-level device does not need to execute multiple times of authentication with respect to each of the slave devices, though such authentication is needed in a conventional technology. As a result, the mutual authentication between the higher-level device and the lower-level device can be completed with a less number of information exchanging steps, being compared with conventional authentication, so that a processing time for authentication can be shortened.

(5) The mutual authentication method; wherein the higher-level device includes an authentication processing unit for authenticating each of the plurality of slave devices; and the mutual authentication method further comprises: a creating step; in which the authentication processing unit creates higher-level information for authentication for authenticating each of the plurality of slave devices, and also creates authentication response information by way of mixing the higher-level information for authentication and the transmitted lower-level information for authentication.

According to the present invention, in the mutual authentication method, the creating step of the authentication processing unit creates the higher-level information for authentication for authenticating each of the plurality of slave devices, and creates the authentication response information by way of mixing the higher-level information for authentication and the lower-level information for authentication. Accordingly, there can be created information for the higher-level device to authenticate the lower-level device, or each of multiple devices; as well as information for the lower-level device, or each of multiple devices to authenticate the higher-level device. Therefore, a processing time for authentication of the mutual authentication system can be shortened.

(6) The mutual authentication method, further comprising; a checking step; in which a comparison is made between the lower-level information for authentication, shared by each of the plurality of slave devices, and the lower-level information for authentication included in the authentication response information transmitted from the higher-level device for checking the lower-level information for authentication, and then the higher-level information for authentication included in the authentication response information is returned to the higher-level device, and the higher-level device makes a comparison between the returned higher-level information for authentication and the higher-level information for authentication created by the higher-level device for checking the higher-level information for authentication.

According to the present invention, at the checking step of the mutual authentication method, even in the case where the lower-level device including the plurality of slave devices is connected to the higher-level device, the higher-level device does not need to execute multiple times of authentication with respect to each of the slave devices, though such authentication is needed in a conventional technology. Therefore, authentication is needed only with respect to the lower-level device so that a processing time for authentication by the mutual authentication system can be shortened.

(7) The mutual authentication method; wherein, in the checking step, each of the plurality of slave devices extracts the higher-level information for authentication out of the authentication response information to return it to the authentication management unit, and the authentication management unit returns the higher-level information for authentication to the higher-level device if the higher-level information for authentication returned from the plurality of slave devices is all identical.

According to the present invention, the authentication management unit returns the higher-level information for authentication to the higher-level device if the higher-level information for authentication returned from the plurality of slave devices is all identical; and namely, the higher-level device is notified after making sure that the plurality of slave devices are all in normal condition. Therefore, security performance can be further improved.

According to the present invention, in the mutual authentication system in which the higher-level device and the lower-level device mutually authenticate each other, the lower-level device is equipped with an authentication management unit; and therefore the higher-level device can execute authentication with the lower-level device, or a plurality of slave devices, by means of sending/receiving information of mutual authentication from/to the higher-level device to/from the authentication management unit, even in the case where the lower-level device has the plurality of slave devices. Accordingly, the higher-level device does not need to execute multiple times of authentication with respect to each of the slave devices, though such authentication is needed in a conventional technology. Eventually, the system to be constructed becomes simple, and then the mutual authentication system can easily be constructed.

Furthermore, according to the mutual authentication method of the present invention, the lower-level device is equipped with the authentication management unit; and therefore, even in the case where the lower-level device has the plurality of slave devices, the higher-level device does not need to execute multiple times of authentication with respect to each of the slave devices, though such authentication is needed in a conventional technology. As a result, the mutual authentication between the higher-level device and the lower-level device can be completed with a less number of information exchanging steps, being compared with conventional authentication, so that a processing time for authentication can be shortened.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
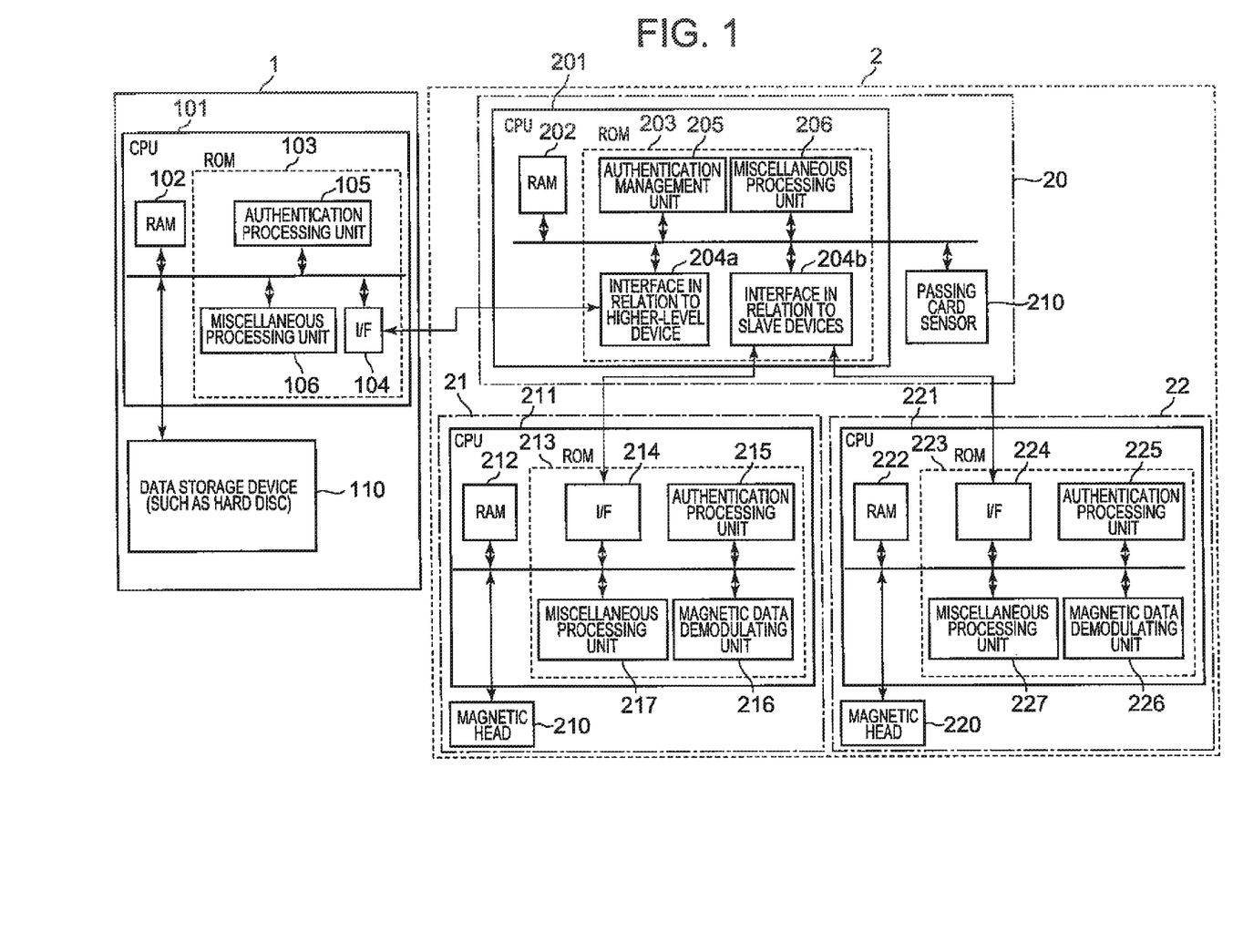
FIG. 1 is a general block diagram showing an electrical configuration of an authentication system according to an embodiment of the present invention.

General Configuration of a System:

FIG. 1 is a general block diagram showing an electrical configuration of an authentication system according to an embodiment of the present invention.

In FIG. 1, a higher-level device 1 is a host, for example, such as an ATM. A lower-level device 2 is a card reader connected to the host 1, and the card reader 2 reproduces magnetic information recorded in a magnetic stripe formed on a card, or records new magnetic information into the card. The card reader 2 includes a first encryption magnetic head device 21 as a first slave device, and a second encryption magnetic head device 22 as a second slave device. The first encryption magnetic head device 21 and the second encryption magnetic head device 22 are placed at both sides of a card transfer path, not shown, so as to be opposite each other; and the two are so structured as to be able to read magnetic data of a magnetic stripe formed on a card.

Higher-Level Device: Host

In FIG. 1, the host 1 includes a CPU 101 and a data storage device 110 such as a hard disc, wherein the CPU 101 internally includes a RAM 102 and a ROM 103. Stored in the ROM 103 are an interface 104, an authentication processing unit 105, a miscellaneous processing unit 106, and the like; while the elements listed above being as various programs for controlling the host 1.

The CPU 101 executes the programs stored in the ROM 103 to control each part of the host 1, while using the RAM 102 included internally in the CPU 101 as a working memory. Furthermore, in the present embodiment, the RAM 102 holds higher-level information for authentication, lower-level information for authentication, authentication response information created by mixing the two types of information described above, and a secret key to be shared. Cryptographic communication using a shared secret key in this way is called a common key cryptogram method, and the key to be used between communicating users for executing a cryptographic process based on a common key cryptogram algorithm is a common secret key. Accordingly, in the case of cryptographic processing by means of this cryptogram method, the host 1 as well as the first encryption magnetic head device 21 and the second encryption magnetic head device 22, being as communication users, share and hold a common secret key, e.g., distributed by way of a physically safe method. Incidentally, with respect to the secret key; in the case of multiple counterparts for communication, although it is necessary to save beforehand as many secret keys as counterparts to be authenticated, all of the host 1, the first encryption magnetic head device 21, and the second encryption magnetic head device 22 may simply hold one common secret key in the present embodiment.

The interface 104 provides an interface with a control unit 20 of the card reader 2, and includes a connector and so on. Moreover, the interface 101 may adopt a serial bus interface such as an USB, an IEEE1394, and the like; or a communication interface that is wired, wireless, or infrared.

Being equipped with a creating means, an encrypting/decoding means, and a checking means, all of which are not shown; the authentication processing unit 105 mutually authenticates each other with the first encryption magnetic head device 21, and the second encryption magnetic head device 22 by the intermediary of an authentication management unit 205 in the control unit 20. The creating means of the authentication processing unit 105 creates higher-level information for authentication in order for authenticating each of the plurality of the first encryption magnetic head device 21 and the second encryption magnetic head device 22. Furthermore, the creating means in the authentication processing unit 105 creates authentication response information by mixing the higher-level information for authentication, and lower-level information for authentication transmitted from the authentication management unit 205. In the present embodiment, information common to the first encryption magnetic head device 21 and the second encryption magnetic head device 22 may be used, and each one set of the higher-level information for authentication and the authentication response information is created. Then, the created authentication response information is transmitted to the authentication management unit 205, and the transmitted authentication response information is transmitted to each of the first encryption magnetic head device 21 and the second encryption magnetic head device 22. In the meantime, the higher-level information for authentication, the lower-level information for authentication, and the authentication response information created by mixing the two types of information described above are stored in the RAM 102.

Furthermore, at the time of authenticating the validity of the first encryption magnetic head device 21 and the second encryption magnetic head device 22, the authentication processing unit 105 provides secret key data to be shared (hereinafter, called a 'secret key') for transmitting/receiving the higher-level information for authentication, the lower-level information for authentication, and the authentication response information, to the first encryption magnetic head device 21 and the second encryption magnetic head device 22. The encrypting/decoding means of the authentication processing unit 105 executes a process of encrypting or decoding the higher-level information for authentication, the lower-level information for authentication, and the authentication response information by using the secret key that the RAM 102 holds. Moreover, by making a comparison between higher-level information for authentication returned from the authentication management unit 205 and the created higher-level information for authentication, the checking means of the authentication processing unit 105 checks the higher-level information for authentication. If the two sets of the higher-level information for authentication agree with each other, the validity of the first encryption magnetic head device 21 and the second encryption magnetic head device 22 is authenticated.

Lower-Level Device: Card Reader

In the card reader 2, the first encryption magnetic head device 21 and the second encryption magnetic head device 22 are placed at both sides of a card transfer path, not shown, so as to be opposite each other; and the card reader 2 is so configured as to become able to read out magnetic data of a magnetic stripe formed on a card. In FIG. 1, the control unit 20 of the card reader 2 includes a CPU 201 and a passing card sensor 210, and the CPU 201 internally has a RAM 202 and a ROM 203. Stored in the ROM 203 are an interface 204a in relation to the host 1, an interface 204b in relation to the first encryption magnetic head device 21 and the second encryption magnetic head device 22, the authentication management unit 205, a miscellaneous processing unit 206, and the like; while the elements listed above being as various programs for controlling the card reader 2. The miscellaneous processing unit 206, for example, receives a secret key Ka that the host 1 loads by means of a safe method, and executes transmission to the plurality of the first encryption magnetic head device 21 and the second encryption magnetic head device 22. The RAM 202 is used as a working area for various operations that the CPU 201 conducts. Furthermore, in the present embodiment, the RAM 202 can hold the lower-level information for authentication and the higher-level information for authentication.

The CPU 201 executes the programs saved in the ROM 203 existing inside the CPU in order to control each part of the control unit 20.

The control unit 20 includes the authentication management unit 205 that transmits and receives information to/from the host 1 and each of the plurality of the first encryption magnetic head device 21 and the second encryption magnetic head device 22, the information being in order for the host 1 and each of the plurality of the first encryption magnetic head device 21 and the second encryption magnetic head device 22 to mutually authenticate each other.

The interface 204a provides an interface in relation to the host 1, and in the meantime, the interface 204b provides an interface in relation to the first encryption magnetic head device 21 and the second encryption magnetic head device 22, and each of them includes a connector and so on. Moreover, the interface 204a and the interface 204b may adopt a serial bus interface such as an USB, an IEEE1394, and the like; or a communication interface that is wired, wireless, or infrared.

Figure 2:
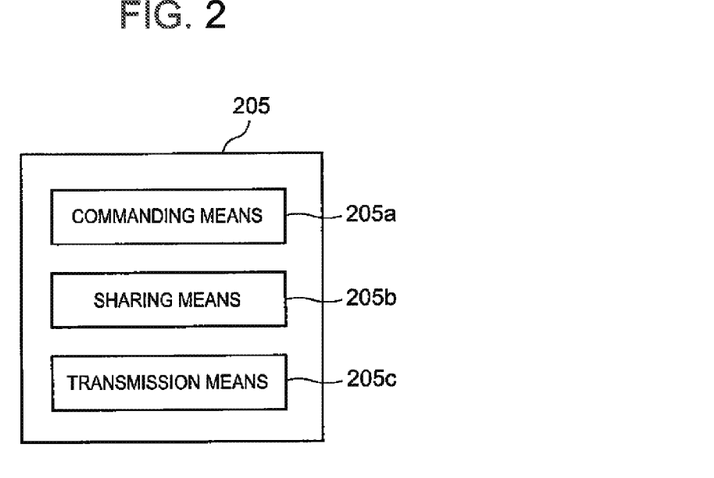
FIG. 2 is a block diagram showing details of a control unit of the present authentication system.

The authentication management unit 205 has a function of managing a process in order for the authentication processing unit 105 of the host 1 and each of the first encryption magnetic head device 21 and the second encryption magnetic head device 22 to mutually authenticate each other. As shown in FIG. 2, the authentication management unit 205 includes a commanding means 205a, a sharing means 205b, and a transmission means 205c, as constituent elements; and the authentication management unit 205 manages a process in order for the host 1 and each of the first encryption magnetic head device 21 and the second encryption magnetic head device 22 to mutually authenticate each other, by using the lower-level information for authentication, the higher-level information for authentication, and the authentication response information created by mixing the two types of information described above.

According to a request on authentication from the host 1, the commanding means 205a provides either encryption magnetic head device of the first encryption magnetic head device 21 and the second encryption magnetic head device 22, with a command of creating lower-level information for authentication. For example, the host 1 transmits a request command, which requests creating lower-level information for authentication, to the card reader 2. Meanwhile, the commanding means 205a of the authentication management unit 205 receives the transmitted request command; and for example, requests the first encryption magnetic head device 21 to create lower-level information for authentication. Incidentally, although the commanding means 205a randomly selects an encryption magnetic head device (a slave device) that is requested to create the lower-level information for authentication, the commanding means 205a may alternately select it, or always select a certain objective device. The sharing means 205b receives the lower-level information for authentication created by the first encryption magnetic head device 21; and stores the received lower-level information for authentication in the RAM 202 inside the CPU 20, and moreover transmits the same to the other device, i.e., the second encryption magnetic head device 22. After recognizing that the lower-level information for authentication has been shared between the first encryption magnetic head device 21 and second encryption magnetic head device 22, the transmission means 205c transmits the lower-level information for authentication stored in the RAM 202, to the host 1.

Slave Devices: First Encryption Magnetic Head Device and Second Encryption Magnetic Head Device The plurality of the first encryption magnetic head device 21 and the second encryption magnetic head device 22 are individually equipped with an authentication processing unit 215 and another authentication processing unit 225 that create lower-level information for authentication to be used for authenticating the host 1. The lower-level information for authentication is stored in the RAM 212 and the RAM 222 of the first encryption magnetic head device 21 and the second encryption magnetic head device 22, individually; and furthermore it is stored in the RAM 202 of the control unit 20. The first encryption magnetic head device 21 and the second encryption magnetic head device 22 read out magnetic data of a magnetic stripe formed on a card, not shown; and encrypt the data inside the first encryption magnetic head device 21 and the second encryption magnetic head device 22, in order to transmit the encrypted data to the host 1 by the intermediary of the control unit 20 of the card reader 2. Incidentally, in the present embodiment, for making it possible to handle a card provided with a magnetic stripe formed on at least one of both sides of the card, the first encryption magnetic head device 21 and the second encryption magnetic head device 22 are placed at both sides (upper and lower sides) of a card transfer path, in such a way that magnetic information of the magnetic stripe is read out by the first encryption magnetic head device 21 and the second encryption magnetic head device 22, at the time when the card is transferred through the card transfer path of the card reader. In this way, by means of encrypting the read magnetic data inside the devices, the magnetic data at a stage of transmission to the host 1 is protected from a theft and deception to enhance security.

In the present embodiment, the first encryption magnetic head device 21 and the second encryption magnetic head device 22 are placed at both the sides of the card transfer path so as to be opposite each other; and the encryption magnetic head devices are so configured as to be able to read out the magnetic data, while contacting and sliding on the magnetic stripe of the card inserted, regardless of an orientation of the card.

In FIG. 1, the first encryption magnetic head device 21 includes a CPU 211 and a magnetic head 210; and the CPU 211 internally includes a RAM 212 and a ROM 213. The CPU 211 executes a program saved in the ROM 213 to control each part of the first encryption magnetic head device 21. The RAM 212 is used as a working area for various operations that the CPU 211 conducts. Moreover, in the present embodiment, the RAM 212 holds a secret key, and lower-level information for authentication. Stored in the ROM 213 are an interface 214 in relation to the control unit 20, an authentication processing unit 215, a magnetic data demodulating unit 216, and a miscellaneous processing unit 217, and the like; while the elements listed above being as various programs for controlling the card reader 2.

The interface 214 is an interface corresponding to the interface 204b of the control unit 20.

Being equipped with a creating means, an encrypting/decoding means, a checking means, and an extracting means, all of which are not shown; the authentication processing unit 215 mutually authenticates each other with the host 1 by the intermediary of the authentication management unit 205 in the control unit 20. The creating means of the authentication processing unit 215 creates lower-level information for authentication that the first encryption magnetic head device uses for authenticating a higher-level device. The encrypting/decoding means of the authentication processing unit 215 executes a process of encrypting or decoding the higher-level information for authentication, the lower-level information for authentication, and the authentication response information by using the shared secret key that the RAM 21 holds, according to a publicly known encrypting algorithm. Moreover, the extracting means of the authentication processing unit 215 extracts the higher-level information for authentication and the lower-level information for authentication, out of the authentication response information transmitted from the host 1. Furthermore, by making a comparison between the shared lower-level information for authentication and the lower-level information for authentication included in the authentication response information transmitted from the host 1, the checking means of the authentication processing unit 215 checks the lower-level information for authentication.

The magnetic data demodulating unit 216 demodulates magnetic information read out by the magnetic head 210, being as the first encryption magnetic head device 21, by way of a publicly known means such as binarization to make data that can be transmitted to the host 1.

In FIG. 1, the second encryption magnetic head device 22 includes a CPU 221 and a magnetic head 220; and the CPU 221 internally includes a RAM 222 and a ROM 223. Stored in the ROM 223 are an interface 224 in relation to the control unit 20, an authentication processing unit 225, a magnetic data demodulating unit 226, and a miscellaneous processing unit 227, and the like; while the elements listed above being as various programs for controlling the card reader 2. The RAM 222 is used as a working area for various operations that the CPU 221 conducts. Moreover, in the present embodiment, the RAM 222 holds a common key, and lower-level information for authentication. Furthermore, being equipped with a creating means, an encrypting/decoding means, a checking means, and an extracting means, all of which are not shown; the authentication processing unit 225 mutually authenticates each other with the host 1 by the intermediary of the authentication management unit 205 in the control unit 20. A configuration of units is the same as that of the first encryption magnetic head device 21.

Figure 3:
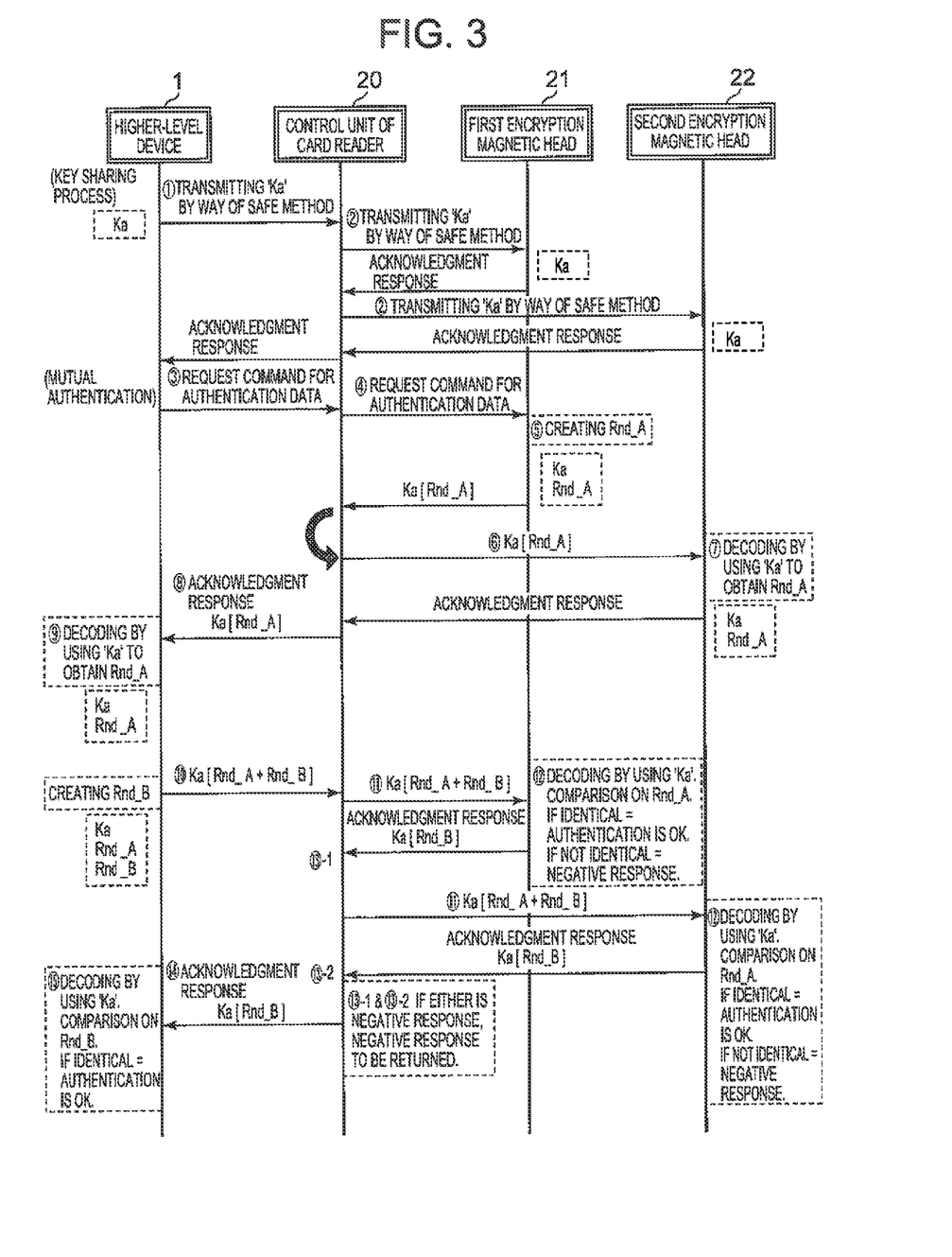
FIG. 3 is a flowchart showing an example of operation processing of the present authentication system.
Figure 4:
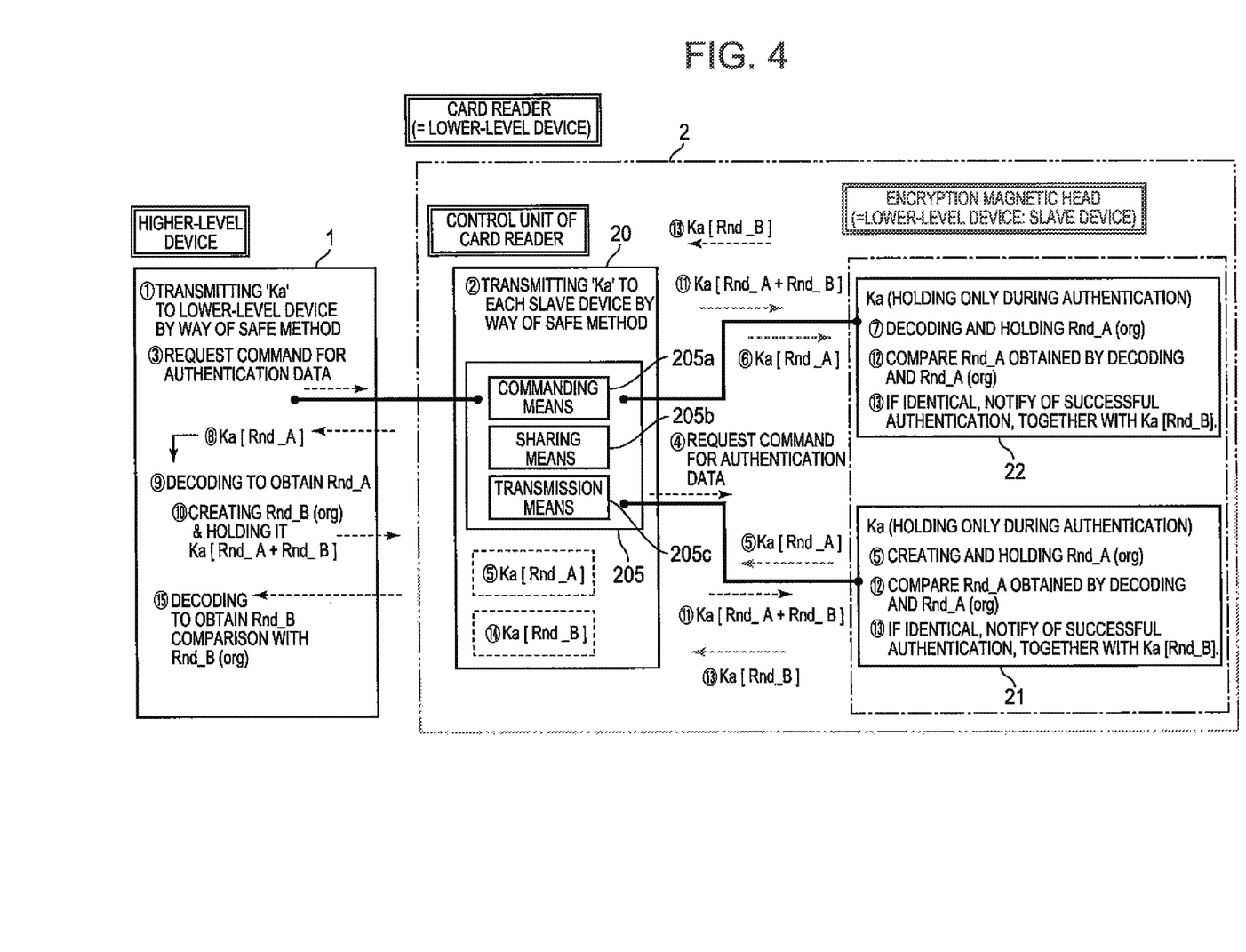
FIG. 4 is a block diagram showing an example of the operation processing.

Method for Mutual Authentication Among Devices:

Explained next is a processing procedure of a system for mutual authentication according to the present invention. FIG. 3 is a flowchart showing an example of operation processing of the system for mutual authentication. Meanwhile, FIG. 4 is a block diagram showing an example of the operation processing.

In the procedure described below, each number noted in brackets corresponds to an encircled numeral with the same number in FIG. 3 and FIG. 4, and those numbers noted in brackets represent operation orders in the authentication processing.

Secret Key Sharing Process:

[1] The host 1 transmits a secret key 'Ka' for encrypting the information in order for the host 1 and each of the first encryption magnetic head device 21 and the second encryption magnetic head device 22 to mutually authenticate each other, through the interface 204a of the card reader 2, for a higher-level device, to the miscellaneous processing unit 206 in the control unit 20 by way of a safe method. Meanwhile, the host 1 holds the secret key 'Ka' in the RAM 102. Namely, the secret key 'Ka' is a key shared between the host 1 and both the first encryption magnetic head device 21 and the second encryption magnetic head device 22.

[2] The miscellaneous processing unit 206 loads the received secret key 'Ka' into the first encryption magnetic head device 21 and the second encryption magnetic head device 22, through the interface 204b, the interface 214, and the interface 224, by way of a safe method. The first encryption magnetic head device 21 and the second encryption magnetic head device 22 individually transmit each acknowledgment response showing that the secret key 'Ka' has been received, to the miscellaneous processing unit 206. After receiving the acknowledgment response from the first encryption magnetic head device 21 and the second encryption magnetic head device 22, the miscellaneous processing unit 206 transmits an acknowledgment response showing that the secret key 'Ka' has been received, to the host 1. In the meantime, the first encryption magnetic head device 21 and the second encryption magnetic head device 22 hold the loaded secret key 'Ka' in the RAM 212 and the RAM 222, respectively. Incidentally, as for the method of loading the secret key 'Ka' into the first encryption magnetic head device 21 and the second encryption magnetic head device 22, any type of method may be adopted as far as it is a safe method.

Mutual Authentication:

[3] Next, the host 1 transmits a request command to the authentication management unit 205, the request command making a request to the card reader 2 for creating lower-level information for authentication.

[4] Having received the request command, the commanding means 205a of the authentication management unit 205 requests either encryption magnetic head device; for example, the first encryption magnetic head device 21; to create the lower-level information for authentication.

[5] In the first encryption magnetic head device 21 having received the request, the creating means of the authentication processing unit 215 creates at random and obtains lower-level information for authentication [Rnd_A]. Then, the encrypting/decoding means of the authentication processing unit 215 encrypts the created lower-level information for authentication [Rnd_A] according to the encrypting algorithm described above, by using the secret key 'Ka' loaded beforehand; and the authentication processing unit 215 transmits lower-level information for authentication Ka [Rnd_A] that is encrypted, to the authentication management unit 205. In the meantime, the authentication processing unit 215 holds the lower-level information for authentication [Rnd_A] in the RAM 212. Incidentally, while the authentication processing unit 215 being internally equipped with a memory unit (not shown), the secret key 'Ka' and the lower-level information for authentication [Rnd_A] may be stored in the memory unit.

[6] The sharing means 205b of the authentication management unit 205 holds the received lower-level information for authentication Ka [Rnd_A] that is encrypted, in the RAM 202; and moreover transmits the same to the other device, i.e., the second encryption magnetic head device 22.

[7] In the second encryption magnetic head device 22 having received the encrypted lower-level information for authentication Ka [Rnd_A], the encrypting/decoding means of the authentication processing unit 225 decodes the received data according to the encrypting algorithm described above, by using the secret key 'Ka' loaded beforehand in order to obtain the lower-level information for authentication [Rnd_A], which is then held in the RAM 222.

[8] After the encrypted lower-level information for authentication Ka [Rnd_A] is transmitted to the second encryption magnetic head device 22, the transmission means 205c of the authentication management unit 205 transmits the encrypted lower-level information for authentication Ka [Rnd_A] to the host 1. Incidentally, in the present embodiment, the authentication management unit 205 transmits the encrypted lower-level information for authentication Ka [Rnd_A] to the host 1, after receiving an acknowledgment response returned from the second encryption magnetic head device 22 in the case where the encrypted lower-level information for authentication Ka [Rnd_A] has successfully been decoded, as shown in FIG. 3.

[9] By using the secret key 'Ka' stored beforehand in the RAM 102, the host 1 decodes the received lower-level information for authentication Ka [Rnd_A] that is encrypted, in order to obtain the lower-level information for authentication [Rnd_A] that has come from the card reader 2. Then, the lower-level information for authentication [Rnd_A] is held in the RAM 102.

[10] In the host 1, the creating means of the authentication processing unit 105 creates at random and obtains higher-level information for authentication [Rnd_B] for authenticating a lower-level device. Furthermore, the creating means of the authentication processing unit 105 mixes the created higher-level information for authentication [Rnd_B] with the lower-level information for authentication [Rnd_A] received from the card reader 2, in order to create authentication response information [Rnd_A+Rnd_B]. Next, the encrypting/decoding means of the authentication processing unit 105 encrypts the created authentication response information [Rnd_A+Rnd_B] by using the secret key 'Ka'. Then, the authentication processing unit 105 transmits the encrypted authentication response information Ka [Rnd_A+Rnd_B] to the authentication management unit 205; and the authentication processing unit 105 stores for itself the created higher-level information for authentication [Rnd_B] in the RAM 102.

[11] The sharing means 205b of the authentication management unit 205 transmits the received authentication response information Ka [Rnd_A+Rnd_B] that is encrypted, to the first encryption magnetic head device 21 and the second encryption magnetic head device 22.

[12] Each encrypting/decoding means of the authentication processing unit 215 and the authentication processing unit 225 in the first encryption magnetic head device 21 and the second encryption magnetic head device 22, respectively, decodes the encrypted authentication response information Ka [Rnd_A+Rnd_B], by using the secret key 'Ka' loaded beforehand. Furthermore, out of the information, each extracting means of the authentication processing unit 215 and the authentication processing unit 225 extracts the lower-level information for authentication [Rnd_A] for authenticating the host 1. Then, each checking means of the authentication processing unit 215 and the authentication processing unit 225 checks the decoded lower-level information for authentication with the lower-level information for authentication [Rnd_A] that is stored beforehand in the RAM 212 and the RAM 222, respectively.

[13] If the lower-level information for authentication [Rnd_A], which is stored beforehand in the RAM 212 and the RAM 222, is identical with the decoded lower-level information for authentication, which is in order for authenticating the host 1, each checking means of the authentication processing unit 215 and the authentication processing unit 225 considers that the higher-level device has successfully been authenticated. Next, the encrypting/decoding means of each of the authentication processing unit 215 and the authentication processing unit 225 encrypts the higher-level information for authentication [Rnd_B] for authenticating a lower-level device, extracted out of the authentication response information [Rnd_A+Rnd_B] in the same manner as described above, by using the secret key 'Ka'. Then, the encrypted higher-level information for authentication is returned together with a notification of the successful authentication check result to the authentication management unit 205.

[14] If once the authentication management unit 205 makes sure of the successful authentication check result from both of the first encryption magnetic head device 21 and the second encryption magnetic head device 22, the transmission means of the authentication management unit 205 transmits the encrypted higher-level information for authentication Ka [Rnd_B] that is received from one of the encryption magnetic head devices, to the host 1.

[15] The host 1 decodes the encrypted higher-level information for authentication Ka [Rnd_B], which the authentication processing unit 105 has received, by way of the encrypting/decoding means of the authentication processing unit 105; and makes a comparison between the decoded higher-level information for authentication and the higher-level information for authentication [Rnd_B] held in the RAM 102. If the decoded higher-level information for authentication is identical with the held higher-level information for authentication [Rnd_B], the checking means of the authentication processing unit 105 considers that the lower-level device has successfully been authenticated. In other words, the validity of the first encryption magnetic head device 21 and the second encryption magnetic head device 22 is authenticated.

Then, as a result of the series of steps described above, the mutual authentication system considers, it has been authenticated that the host 1 and the card reader 2; namely, the first encryption magnetic head device 21 and the second encryption magnetic head device 22; are both valid.

Advantageous Effect of the Present Embodiment

According to the mutual authentication system of the present embodiment 1, even in the case where the card reader 2 including the first encryption magnetic head device 21 and the second encryption magnetic head device 22 is connected to the host 1, the host 1 can handle the card reader 2 as a single device having a security function, without recognizing a configuration of the first encryption magnetic head device 21 and the second encryption magnetic head device 22 in the card reader 2.

Furthermore, according to the mutual authentication system of the present embodiment 1, the host 1 does not need to execute multiple times of authentication with respect to each of the first encryption magnetic head device 21 and the second encryption magnetic head device 22, though such authentication is needed in a conventional technology. Therefore, the mutual authentication between the host 1 and the authentication management unit 205 of the card reader 2 can be completed with a less number of information exchanging steps; for example, just a one-time information exchanging step in the present embodiment 1. As a result, a processing time before proceeding to a regular operation step of the system can be shortened. More specifically to describe, according to the present embodiment 1, the host 1 needs to request the authentication management unit 205 of the card reader 2 just one time to create the lower-level information for authentication; and on the other hand, the authentication management unit 205 of the card reader 2 needs to transmit the lower-level information for authentication to the host 1 just one time. Accordingly, being able to handle the card reader 2 as a single device having a security function, the host 1 can complete the mutual authentication without recognizing a configuration of slave devices in the card reader 2, so that the system can simply be configured.

Moreover, in the mutual authentication system, the card reader 2 is provided with the authentication management unit 205, and therefore the system to be configured becomes simple. As a result, a processing time for the mutual authentication between the host 1 and the card reader 2 is shortened, so that a system for easy operation can be configured.

Moreover, according to the mutual authentication system of the present embodiment, even in the case where the card reader 2 including the first encryption magnetic head device 21 and the second encryption magnetic head device 22 is connected to the host 1, the host 1 does not need to execute authentication with respect to each of the first encryption magnetic head device 21 and the second encryption magnetic head device 22, though such authentication is needed in a conventional technology. For the mutual authentication, the host 1 only needs operation with the authentication management unit 205 of the card reader 2. Therefore, the mutual authentication between the host 1 and the authentication management unit 205 of the card reader 2 can be completed with a less number of information exchanging steps; for example, just a one-time information exchanging step in the present embodiment. As a result, a processing time before proceeding to a regular operation step of the system can be shortened.

Furthermore, since the first encryption magnetic head device 21 and the second encryption magnetic head device 22 include the authentication processing unit 215 and the authentication processing unit 225 in order to create lower-level information for authentication, each of the first encryption magnetic head device 21 and the second encryption magnetic head device 22 authenticates the host 1 so that security performance can be improved.

Moreover, it is not needed to create a program for the host 1 to execute mutual authentication with respect to each of the first encryption magnetic head device 21 and the second encryption magnetic head device 22, though it is needed in a conventional technology; and therefore, costs can be reduced.

According to the present embodiment 1, the host 1 includes the authentication processing unit 105 for authenticating each of the first encryption magnetic head device 21 and the second encryption magnetic head device 22. (The creating means of) the authentication processing unit 105 creates the higher-level information for authentication in order to authenticate each of multiple slave devices, and also creates the authentication response information by way of mixing the higher-level information for authentication and the lower-level information for authentication transmitted from the authentication management unit 205. Accordingly, there can be created information for a higher-level device to authenticate a lower-level device, or each of multiple devices; as well as information for the lower-level device, or each of multiple devices to authenticate the higher-level device. Therefore, a processing time for authentication of the mutual authentication system can be shortened.

Furthermore, according to the present embodiment 1; since the host 1 and the first encryption magnetic head device 21 and the second encryption magnetic head device 22 mutually authenticate each other by means of a common key cryptogram method, information can be transmitted/received while being modified, the information being for the host 1 and the first encryption magnetic head device 21 and the second encryption magnetic head device 22 to mutually authenticate each other by using the secret key shared. In other words, the information for mutual authentication (lower-level information for authentication, higher-level information for authentication, and authentication response information) comes to have different values by way of encryption, and therefore it becomes difficult to guess about the information for authentication so that security performance can be improved. Accordingly, countermeasures are taken against a threat of bugging, falsification, and impersonation in information communication between the host 1 and the first encryption magnetic head device 21 and the second encryption magnetic head device 22 so as to enable safe mutual authentication.

Moreover, in the mutual authentication system according to the present embodiment 1, used is a common key cryptogram method in which a secret key is used for encryption as well as decoding in common. Therefore, being compared with a public key encryption technology in which different encryption keys are separately used for encryption and decoding, a process speed is faster so that a processing time for mutual authentication can also be shortened.

Part of functions of the control unit 20 included in the card reader 2 according to the present embodiment 1 are shared by the first encryption magnetic head device 21 and the second encryption magnetic head device 22. Therefore, an operation load of the authentication management unit 205 for mutual authentication can be reduced. Furthermore, since part of functions of the control unit 20 in the card reader 2 are shared by the first encryption magnetic head device 21 and the second encryption magnetic head device 22, the control unit 20 does not need to carry out a plurality of processes simultaneously. Therefore, an operation load of the control unit can be reduced, and furthermore costs can be cut.

According to the present embodiment 1, in the mutual authentication method for the host 1 and each of the first encryption magnetic head device 21 and the second encryption magnetic head device 22 in the card reader 2 to mutually authenticate each other, the card reader 2 is equipped with the authentication management unit 205. Therefore, even in the case where the card reader 2 includes the first encryption magnetic head device 21 and the second encryption magnetic head device 22, the host 1 can carry out authentication with the card reader 2, or the first encryption magnetic head device 21 and the second encryption magnetic head device 22, when the host 1 transmits/receives the information for mutual authentication to/from the authentication management unit 205. Therefore, the host 1 does not need to execute authentication with respect to each of the first encryption magnetic head device 21 and the second encryption magnetic head device 22, though such authentication is needed in a conventional technology; and the mutual authentication between the host 1 and the authentication management unit 205 can be completed with a less number of information exchanging steps, being compared with conventional authentication, so that a processing time for authentication can also be shortened. More specifically to describe, according to the mutual authentication method described above, even in the case where the card reader 2 includes the first encryption magnetic head device 21 and the second encryption magnetic head device 22, the host 1 can handle the card reader 2 as a single device having a security function, so that the mutual authentication can be completed by way of one-time operation between the host 1 and the authentication management unit 205 in the present embodiment.

According to the present embodiment 1, the host 1 mixes the lower-level information for authentication and the higher-level information for authentication, and returns the mixed data to the authentication management unit 205. Therefor; since a step of returning the lower-level information for authentication in order for an authentication response by the host 1, and another step of transmitting the higher-level information for authentication for authenticating the card reader 2 by the host 1 can be executed together as a single step, a processing time can be shortened.

Other Embodiments

For the purpose of improving security performance, the mutual authentication system according to the present invention may be configured in such a way that; the authentication management unit 205 makes a comparison at the step [14] described above, on the encrypted higher-level information for authentication Ka [Rnd_B], which is returned from each of the first encryption magnetic head device 21 and the second encryption magnetic head device 22, and a notice of successful authentication is returned to the host 1 only when all data are identical.

Slave devices are not limited to the combination described in the embodiment, and the slave devices may be materialized by way of combining other types of devices that are provided with a security function and in need of authentication; for example, special-purpose boards on which mounted is a processor provided with an encrypting/decoding function for execution of an authenticity verifying process by software. Moreover, three or more devices may be combined.

INDUSTRIAL APPLICABILITY

In a system in which a lower-level device including a plurality of slave devices is connected to a higher-level device, the system and method for mutual authentication according to the present invention makes it possible to complete authentication for every slave device, by way of one-time operation. Therefore, a system is easily configured, and the system itself to be configured becomes simple. Furthermore, a processing time for authentication can also be shortened, and a system for easy operation can be configured. The system and method for mutual authentication according to the present invention is useful from the viewpoint of the reasons described above.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1. Host (higher-level device)
2. Card reader (lower-level device)
20. Control unit
21. First encryption magnetic head device (first slave device)
22. Second encryption magnetic head device (second slave device)
101. CPU (of the host)
105. Authentication processing unit
201. CPU (of the card reader)
205. Authentication management unit
211. CPU (of the first encryption magnetic head device)
215. Authentication processing unit (of the first encryption magnetic head device)
221. CPU (of the second encryption magnetic head device)
225. Authentication processing unit (of the second encryption magnetic head device)

What is claimed is:
1. A mutual authentication system comprising:
a higher-level device and a lower-level device that mutually authenticate each other;
wherein the lower-level device includes:
a control unit configured to control the lower-level device; and
a plurality of slave devices controlled by the control unit;
wherein the control unit includes:
an authentication management unit configured to transmit information to, and receive information from, the higher-level device and each of the plurality of slave devices to mutually authenticate each other;
wherein the plurality of slave devices individually include:

an authentication processing unit configured to create lower-level authentication information for authenticating the higher-level device; and a memory unit configured to save the lower-level authentication information; and wherein the authentication management unit includes:

a commanding means for commanding one of the plurality of slave devices to create the lower-level authentication information, according to a request on authentication from the higher-level device;

a sharing means for transmitting the lower-level authentication information received from the above-mentioned one of the slave devices, to the other of the slave devices for the purpose of sharing the lower-level authentication information; and a transmission means for transmitting the lower-level authentication information, having been shared in all the plurality of slave devices, to the higher-level device.

2. The mutual authentication system according to claim 1;

wherein the higher-level device includes a higher-level authentication processing unit for authenticating each of the plurality of slave devices; and wherein the higher-level authentication processing unit creates higher-level authentication information for authenticating each of the plurality of slave devices, and also creates authentication response information by way of mixing the higher-level authentication information and the transmitted lower-level authentication information.

3. The mutual authentication system according to claim 1;

wherein the mutual authentication system is configured to utilize a common key cryptogram method for the higher-level device and the plurality of slave devices to mutually authenticate each other; and wherein the plurality of slave devices have a secret key that is shared with the higher-level device.

4. A mutual authentication method comprising:

mutual authentication between a higher-level device and each of a plurality of slave devices;

wherein a lower-level device connected to the higher-level device includes:

a control unit configured to control the lower-level device; and the plurality of slave devices controlled by the control unit;

wherein the control unit includes:

an authentication management unit configured to transmit information to and receive information from, the higher-level device and each of the plurality of slave devices to mutually authenticate each other; and wherein the mutual authentication method further comprises:

a commanding step by the authentication management unit, in which one of the plurality of slave devices is commanded to create lower-level authentication information, for each of the plurality of slave devices to authenticate the higher-level device, according to a request on authentication from the higher-level device;

a sharing step by the authentication management unit, in which the lower-level authentication information received from the above-mentioned one of the slave devices, is transmitted to the other of the slave devices for the purpose of sharing it; and a transmission step by the authentication management unit, in which the lower-level authentication information, having been shared in all the plurality of slave devices, is transmitted to the higher-level device.

5. The mutual authentication method according to claim 4;

wherein the higher-level device includes a higher-level, authentication processing unit for authenticating each of the plurality of slave devices; and wherein the mutual authentication method further comprises:

a creating step, in which the higher-level authentication processing unit creates higher-level authentication information for authenticating each of the plurality of slave devices, and also creates authentication response information by way of mixing the higher-level authentication information and the transmitted lower-level authentication information.

6. The mutual authentication method according to claim 5, further comprising:

a checking step, in which:

a comparison is made between the lower-level authentication information, shared by each of the plurality of slave devices, and the lower-level authentication information included in the authentication response information which is transmitted from the higher-level device; and then the higher-level authentication information included in the authentication response information is returned to the higher-level device, and the higher-level device makes a comparison between the returned higher-level authentication information and the higher-level authentication information created by the higher-level device for checking the higher-level authentication information.

7. The mutual authentication method according to claim 6;

wherein, in the checking step:

each of the plurality of slave devices extracts the higher-level authentication information out of the authentication response information, and the higher-level authentication information is sent to the authentication management unit; and the authentication management unit returns the higher-level authentication information to the higher-level device if the higher-level authentication information returned from the plurality of slave devices are all identical.

8. The mutual authentication system according to claim 2;

wherein the mutual authentication system is configured to utilize a common key cryptogram method is for the higher-level device and the plurality of slave devices to mutually authenticate each other; and wherein the plurality of slave devices have a secret key that is shared with the higher-level device.

9. The mutual authentication system according to claim 1;

wherein a common secret key is stored on each of the higher-level device and the slave devices;

wherein each slave device is configured to encrypt the lower-level information by utilizing the common secret key, so that the lower-level authentication information transmitted to the higher-level device by the transmission means is the encrypted lower-level information.

10. The mutual authentication method according to claim 4;

wherein a common secret key is stored on each of the higher-level device and the slave devices;

wherein the mutual authentication method further comprises:

an encrypting step by the authentication management unit, in which the lower-level information is encrypted by utilizing the common secret key; and
wherein the lower-level authentication information transmitted to the higher-level device in the transmission step is the encrypted lower-level information.

* * * * *